United States Patent [19]

Lin

[11] Patent Number: 5,469,515
[45] Date of Patent: Nov. 21, 1995

[54] HALFTONE IMAGE FORMATION USING DITHER MATRIX GENERATED BASED UPON PRINTED SYMBOL MODELS

[76] Inventor: Qian Lin, 159 Gilbert Ave., Santa Clara, Calif. 95051

[21] Appl. No.: 57,244

[22] Filed: May 3, 1993

[51] Int. Cl.$^6$ .................................. G06K 9/38
[52] U.S. Cl. .................. 382/237; 358/457; 358/465; 382/270
[58] Field of Search .................. 382/41, 50, 53; 358/456, 457, 459, 465, 466, 534, 535, 536; H04N 1/40

[56] References Cited

U.S. PATENT DOCUMENTS

| | | | |
|---|---|---|---|
| 4,680,645 | 7/1987 | Dispoto et al. | 358/298 |
| 4,698,778 | 10/1987 | Ito et al. | 364/518 |
| 4,910,603 | 3/1990 | Hirahara et al. | 358/298 |
| 4,924,301 | 5/1990 | Surbrook | 358/75 |
| 5,111,310 | 5/1992 | Parker et al. | 358/456 |

OTHER PUBLICATIONS

Pappas, Thrasyvoulos N., "Model–Based Halftoning", SPIE/IS&t Symposium on Electronic Imaging Science and Technology, San Jose, Calif., 24 Feb.–1 Mar., 1991, pp. 1–10.

Shiau, Jeng–nan et al., "Semiautomatic Printer Calibration with Scanners", Journal of Imaging Science and Technology, vol. 36, No. 3, May/Jun. 1992, pp. 211–219.

Ulichney, Robert, "The Void–and–Cluster Method for Dither Array Generation", SPIE, Feb. 1993.

P. G. Roetling et al, "Tone Reproduction and Screen Design for Pictorial Electrographic Printing", Journal of Applied Photographic Engineering, vol. 5, No. 4, 1979, pp. 179–182.

R. J. Klensch et al., "Electronically Generated Halftone Pictures", RCA Review, vol. 31, No. 3, Sep. 1970, Princeton, US, pp. 517–533.

D. L. Neuhoff et al., "One–Dimensional Least–Squares Model–Based Halftoning", ICASSP–92, vol. 3, M. Multidimensional Signal Processing, 1992 IEEE International Conference on Acoustics, Speech and Signal Processing, 23–26 Mar. 1992, San Francisco, Calif., IEEE, 1992, pp. 189–192.

T. Matsa and K. J. Parker, "Digital Halftoning Using a Blue Noise Mask", Proceedings SPIE–The International Society for Optical Engineering: Image Processing Algorithms and Techniques II; 25 Feb.–1 Mar. 1991, San Jose, Calif., vol. 1452, pp. 47–56.

*Primary Examiner*—Leo H. Boudreau
*Assistant Examiner*—Andrew W. Johns

[57] ABSTRACT

A method of generating a halftone image on a printer from a grey scale image using a dither matrix. The halftone image is represented by symbols when it is printed out by the printer. The matrix includes many patterns. Each pattern has many elements having values with a different number of ones and zeros. The values of the elements in each pattern depend on a model of the symbols. The model is incorporated into the patterns as each pattern is generated.

13 Claims, 20 Drawing Sheets

HALFTONE IMAGE FORMATION USING DITHER MATRIX GENERATED BASED UPON PRINTED SYMBOL MODELS

BACKGROUND OF THE INVENTION

The present invention relates generally to halftone images and more particularly to methods of generating halftone images by a dither matrix.

A printer can be designed to print a picture as a halftone or a grey scale image. For an halftone image, each pixel of the image either has a symbol printed or not printed. For a grey scale image, each symbol on a pixel is further refined to have one of many grey levels.

A halftone image is usually easier and cheaper to generate than a grey scale image. Many relatively low cost printers are specifically designed to print halftone images. To use such a printer to print a grey scale image, the image must be transformed to a half tone image. One objective of the printing industry is to develop appropriate transformation techniques so that the halftone image becomes visually indistinguishable from the grey scale image.

One prior art method transforms a grey scale image to a halftone image by means of a dither matrix. The grey scale image has many pixels, each pixel having a value. The dither matrix occupies a physical space and has numerous elements, each element also having a value. This matrix is mapped over the grey scale image. For an image that is larger than the space occupied by the dither matrix, the matrix replicates itself to cover the entire image. Each element in the matrix is compared to its corresponding grey scale image pixel. If the grey scale image pixel has a larger value, a symbol will not be printed in a corresponding position of the halftone image.

In order to generate a visually pleasing halftone image using the above method, the dither matrix must be carefully designed. The elements in the matrix should not be generated by a random number generator, because a fully random pattern would create a noisy image corrupting the content of the grey scale image.

One prior art method of designing the matrix is known as the void-and-cluster method. A general discussion of the void-cluster method can be found in "The Void-and-Cluster Method for Dither Array Generation," written by Robert Ulichney, published in the SPIE/IS&T Symposium on Electronic Imaging Science and Technology, San Jose, Calif., February, 1993.

FIG. 1A shows one grey level of a halftone image pattern generated by the prior art void-and-cluster method. The Figure was printed by a 600 dots-per-inch printer. To enhance the image, each symbol is magnified nine times, with the image duplicated 4 times, once along the horizontal direction, and then along the vertical direction. The pattern has repetitions of perceptible shapes, such as S1, S2, S3 and S4, that were not present in the grey scale image. Those shapes, as shown in FIG. 1B, are formed when the halftone image is printed by the printer because the printed symbols distort the image.

If the grey scale image has a certain number of grey levels, there should be the same number of halftone image patterns, with levels of lightness ranging from no symbols printed to a pattern entirely filled with symbols. The patterns should decrease linearly in lightness to create a linear tone reflectance curve. The tone reflectance of an image on a printed medium is defined as the percentage of incident light reflected by the image. A printed medium covered with printed symbols has a low tone reflectance. A linear tone reflectance means, for example, that a ten percent decrease in the level of lightness in the halftone image pattern translates to a ten percent reduction in the amount of light reflected.

FIG. 2 shows a grey ramp of the halftone image created by the prior-art void-and-cluster method. A grey ramp prints all the different levels of lightness, one pattern next to the other, from very light to very dark. In the present case, there are 256 patterns. The patterns are quite dark from the middle levels downwards. This is because the symbol printed by the printer is larger than the pixel size of the image. The overlapped symbols have significantly darkened the image. Thus the desired degree of lightness and the actual perceived one are very different. This creates a very non-linear tone reflectance curve. FIG. 3 shows the tone reflectance curve of the grey ramp. The curve maps the tone reflectance against the level of lightness: the higher the level on the x-axis, the lighter the pattern. Most patterns with low pattern numbers, patterns from the middle levels downwards in FIG. 2, have very low tone reflectance. Thus, the curve is very non-linear.

One prior art method tries to correct for the nonlinearity by modifying the dither matrix after its formation. That method first generates the dither matrix. Then the grey ramp of the halftone image formed by the dither matrix is printed, and its tone reflectance curve is measured to get a figure similar to that shown in FIG. 3. From the tone reflectance curve, the dither matrix is modified. The vertical-axis in FIG. 3 is changed from providing the tone reflectance to a mirror image of the horizontal-axis. As an example, the level number 150 on the horizontal-axis is mapped to the level number 25 on the vertical-axis. The values of the elements in the dither matrix are changed accordingly. This eliminates a number of patterns of the dither matrix to create a substantially linear tone reflectance curve. However, the gaps between levels are very non-linear. This is because many levels on the horizontal-axis are mapped to low number levels on the vertical-axis, and significantly fewer levels are mapped to high number levels. A general discussion of such a method can be found in "Semiautomatic Printer Calibration With Scanners," written by Shiau and Williams, and published in the Journal of Imaging Science and Technology, 36(3), 1992, page 211–219.

Another prior art method tries to correct for the nonlinearity by modelling a printed dot in an error diffusion algorithm. This method analyzes every pixel of the grey scale image, one at a time, to decide if a dot is to be printed in the corresponding pixel of the halftone image. Errors from each pixel are "diffused" to subsequent neighboring pixels. Such pixel-to-pixel calculation requires very intensive computation. Thus, the error diffusion method usually takes much longer time to generate the halftone image than the dither matrix method. Moreover, the error diffusion method is not suitable for vector graphics, where the values of pixels on an image may not be calculated sequentially. A discussion of such a method can be found in "Model-Based Halftoning," written by Thrasyvoulos N. Pappas, and published in the SPIE/IS&T Symposium on Electronic Imaging Science and Technology, San Jose, Calif., March, 1991.

There is still a need for a way to generate a halftone image with a linear tone reflectance from a gray scale image without very intensive computation. Furthermore, it is desirable to minimize any repetitions of perceptible shapes when the image is printed by a printer.

SUMMARY OF THE INVENTION

The present invention provides a method of generating a printed halftone image from a grey scale image using a dither matrix. The value of every pixel in the halftone image is determined by a direct comparison of the value of a pixel in the grey scale image to the value of an element in the matrix, without any need for intensive computation. Moreover, the halftone image generated by the method of the invention has negligible repetitions of perceptible shapes when it is printed by a printer.

Briefly and in general terms, in the method of the invention, a printed halftone image is generated from a grey scale image by means of a dither matrix. The halftone image is represented by symbols printed by a printer.

The halftone image, the grey scale image, and the dither matrix, each occupies an area. The three areas are substantially equal to each other.

Both the halftone image and the grey scale image have many pixels, each pixel having a value. The dither matrix has many elements, each element having a value.

The method compares the value of each pixel of the grey scale image with the value of an element in the dither matrix. Based on the result of the comparison, the value of a corresponding pixel of the halftone image is determined.

The plurality of elements in the dither matrix are generated by a plurality of patterns, each pattern having a plurality of elements. Each element in each pattern has a value and occupies a position in the dither matrix area. The value of each element in each pattern is dependent on a model of the symbols printed by the printer as each pattern is generated to form the dither matrix.

Other aspects and advantages of the present invention will become apparent from the following detailed description, taken in conjunction with the accompanying drawings, illustrating by way of example the principles of the invention.

DESCRIPTION OF THE PREFERRED EMBODIMENT

The present invention provides a method to generate a printed halftone image from a grey scale image using a dither matrix. Some prior art methods require intensive computation to generate each pixel of the halftone image. Other prior art methods generate halftone images that have repetitions of perceptible shapes when printed or that have non-linear tone reflectance curves.

In the present invention, the value of every pixel in the halftone image is determined by a simple comparison of the value in a pixel of the grey scale image to the value in an element of the matrix, without the need for intensive computation. The method is suitable for both raster and vector graphics. Moreover, using the invented method, the halftone image produced by a printer has a substantially linear tone reflectance curve with substantially equal gaps between levels and negligible repetitions of perceptible shapes.

Figure 4:
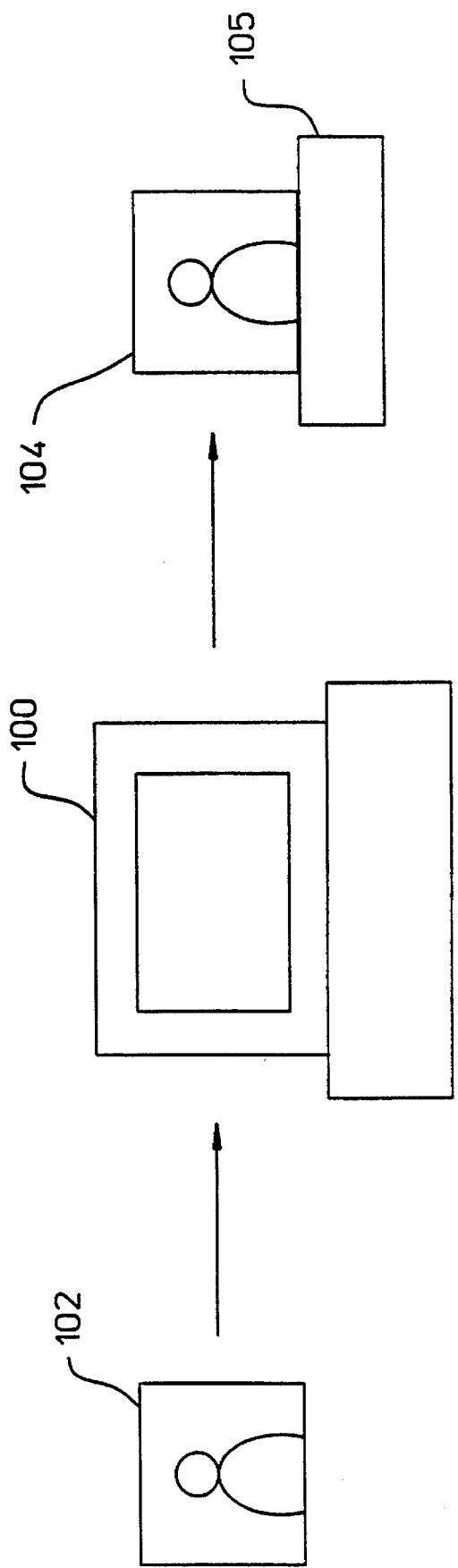
FIG. 4 shows a computer system converting a grey scale image to a halftone image of the present invention.
Figure 5:
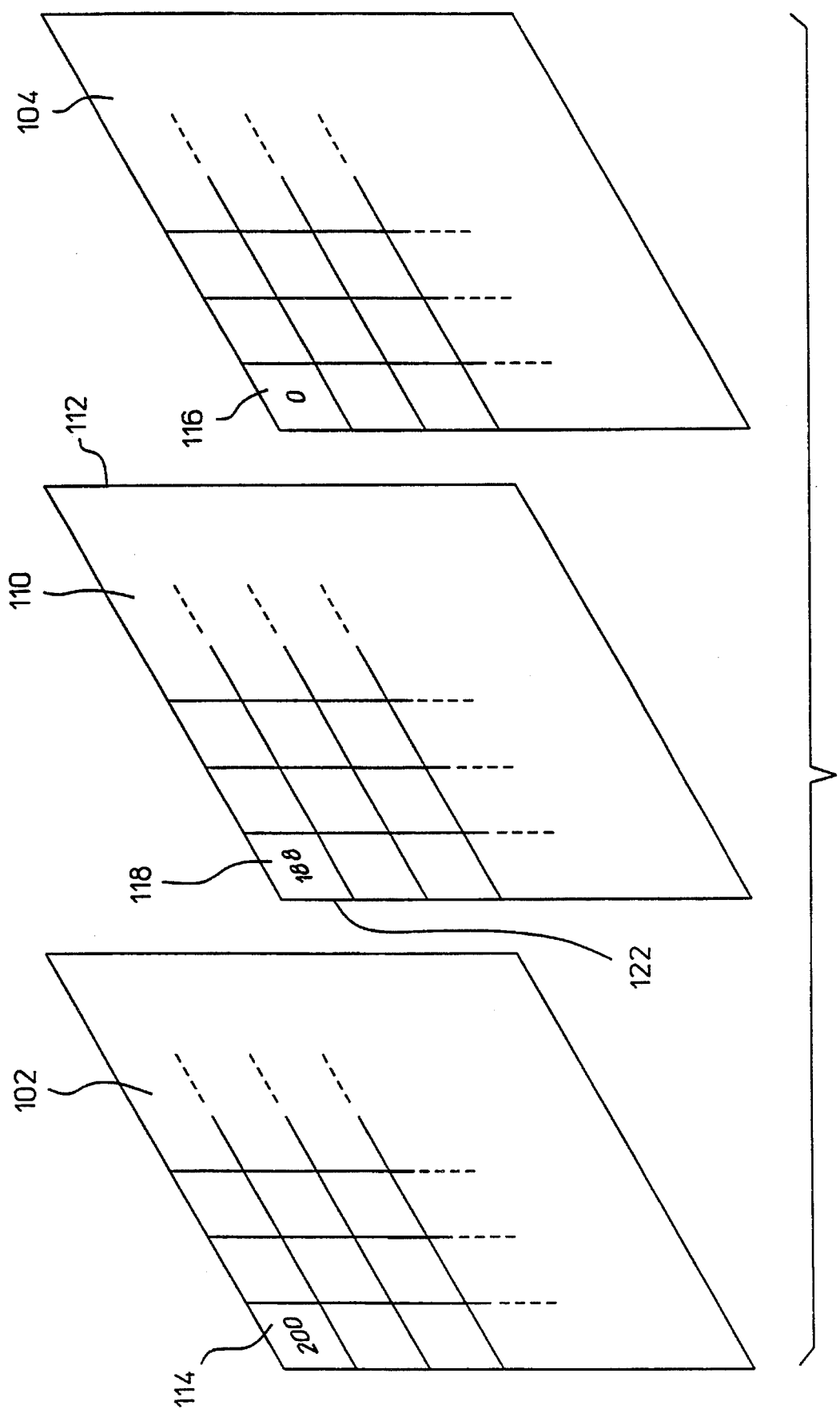
FIG. 5 shows a preferred dither matrix of the present invention for converting the grey scale image to a halftone image.

FIG. 4 shows a computer system 100 incorporating the present invention to convert a grey scale image 102 to a halftone image 104. The halftone image 104 is represented by symbols printed by a printer 105. FIG. 5 shows a preferred dither matrix 110 used by the computer system 100 to generate the halftone image 104. The halftone image 104, the grey scale image 102, and the dither matrix 110, each occupies an area; for example, the dither matrix occupies an area 112. The three areas are substantially equal each other. The size of the dither matrix is small, for example, 0.5 cm by 0.5 cm. For grey scale images that are larger in size than the dither matrix 110, the dither matrix 110 replicates itself to cover the area of the grey scale image so as to generate the halftone image.

Both the halftone image 104 and the grey scale image 102 have many pixels such as the grey scale image pixel 114 and the halftone image pixel 116. Each pixel has a value; for example, the grey scale image pixel 114 has a value of 200 and the halftone image pixel 116 has a value of 0. The dither matrix 110 has many elements; for example, the element 118. In one preferred embodiment, the matrix has 128 rows by 128 columns of elements. Each element has a value and occupies a position in the dither matrix area; for example, the element 118 has a value 188, and occupies a position 122.

Both the grey scale and the halftone images may be in black-and-white or color. One preferred way to represent color is to have three symbols for each pixel, each symbol having a different color.

The method of generating the halftone image includes the steps of comparing the value of each pixel of the grey-scale image with the value of an element in the dither matrix. Based on the result of the comparison, the value of a corresponding pixel of the halftone image is determined. For example, the value 200 of the grey scale image pixel 114 is compared to the value 188 of the element 118. Based on the comparison, the value of the pixel 116 is determined to be a minimum value, such as 0, which means that a symbol will not be printed at that pixel.

Figure 6:
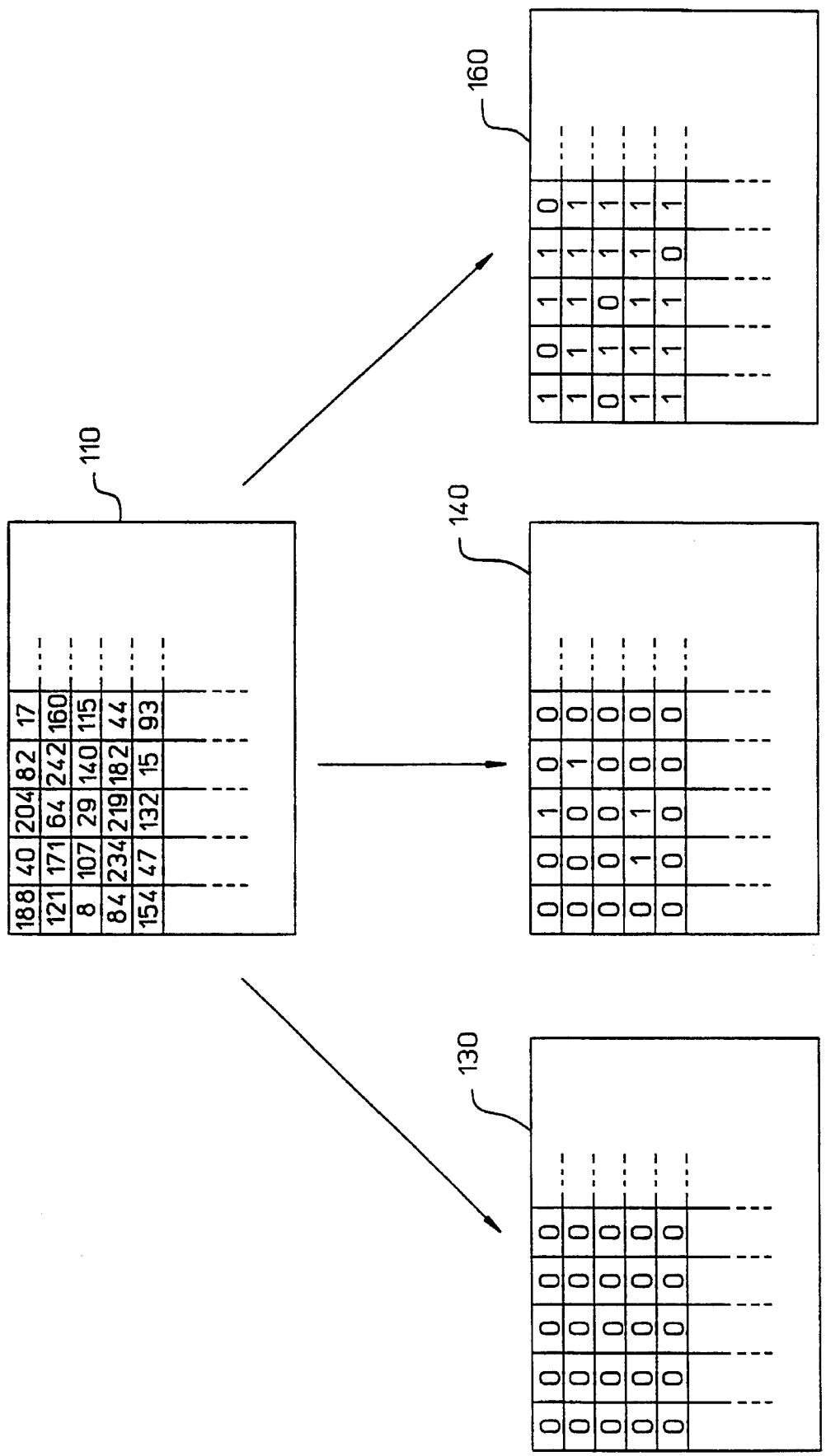
FIG. 6 shows a portion of the preferred dither matrix of the present invention.

FIG. 6 shows a portion of the dither matrix 110. The matrix is made up of many patterns, such as 130, 140 and 160. Every pattern is of the same size and with the same number of elements as the dither matrix. For example, all the values of the elements in the pattern 130 are zeros, and the values of elements in the pattern 160 have more ones than those in the pattern 140. Though the values of the elements are ones and zeros in the present example, other maximum and minimum values can be used.

Figure 7A:
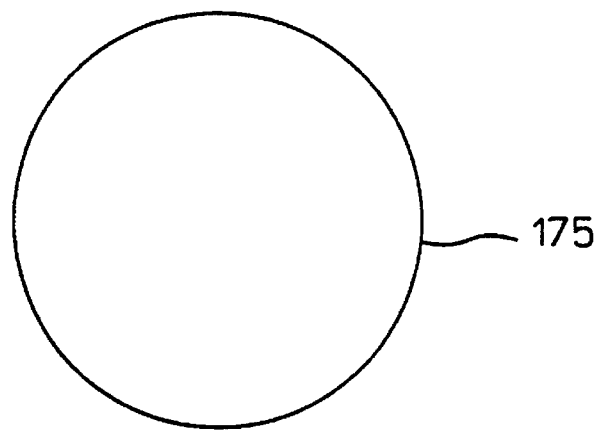
FIGS. 7A–B show two preferred models of the symbols used by the present invention.
Figure 7B:
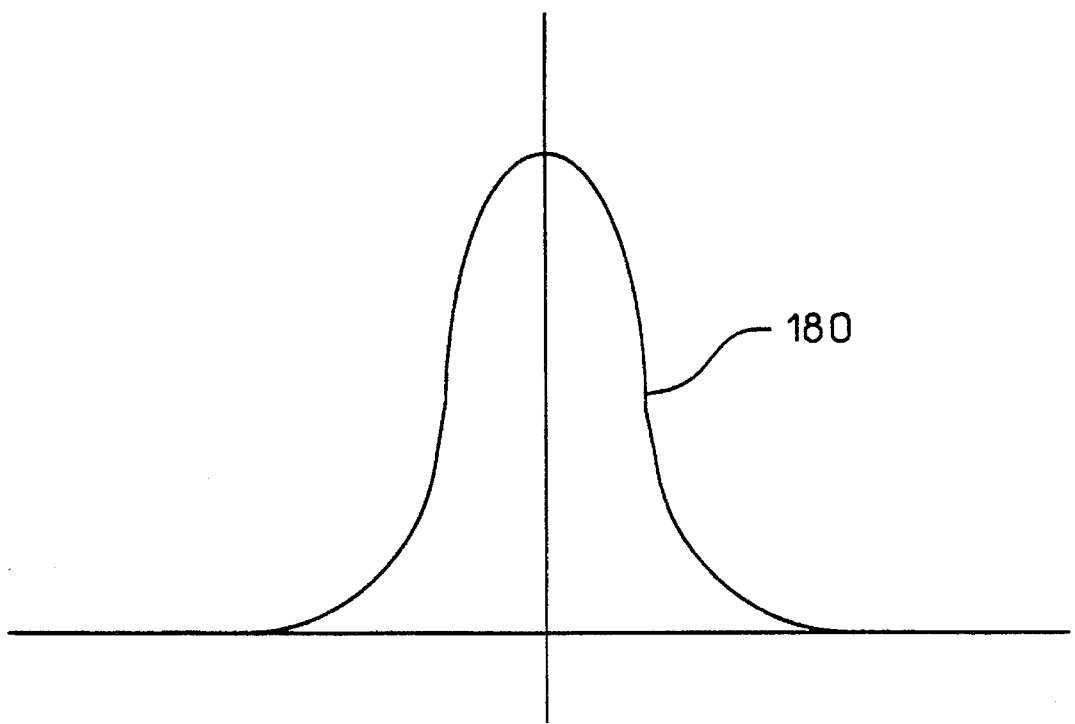

The value of each element in all the patterns is dependent on a model of the symbols printed by the printer 105. FIGS. 7A–B show two models of the symbols. Some printers print a drop of ink on a pixel with the value of one in the halftone image 104. FIG. 7A shows a circle 175 to be the model of the drop of ink. Some printers print toner particles for the pixel. FIG. 7B shows a probability profile 180 representing the probability of having toner particles as a function of location. A third preferred model is a digitized representation of an actual printed symbol.

Figure 1A:
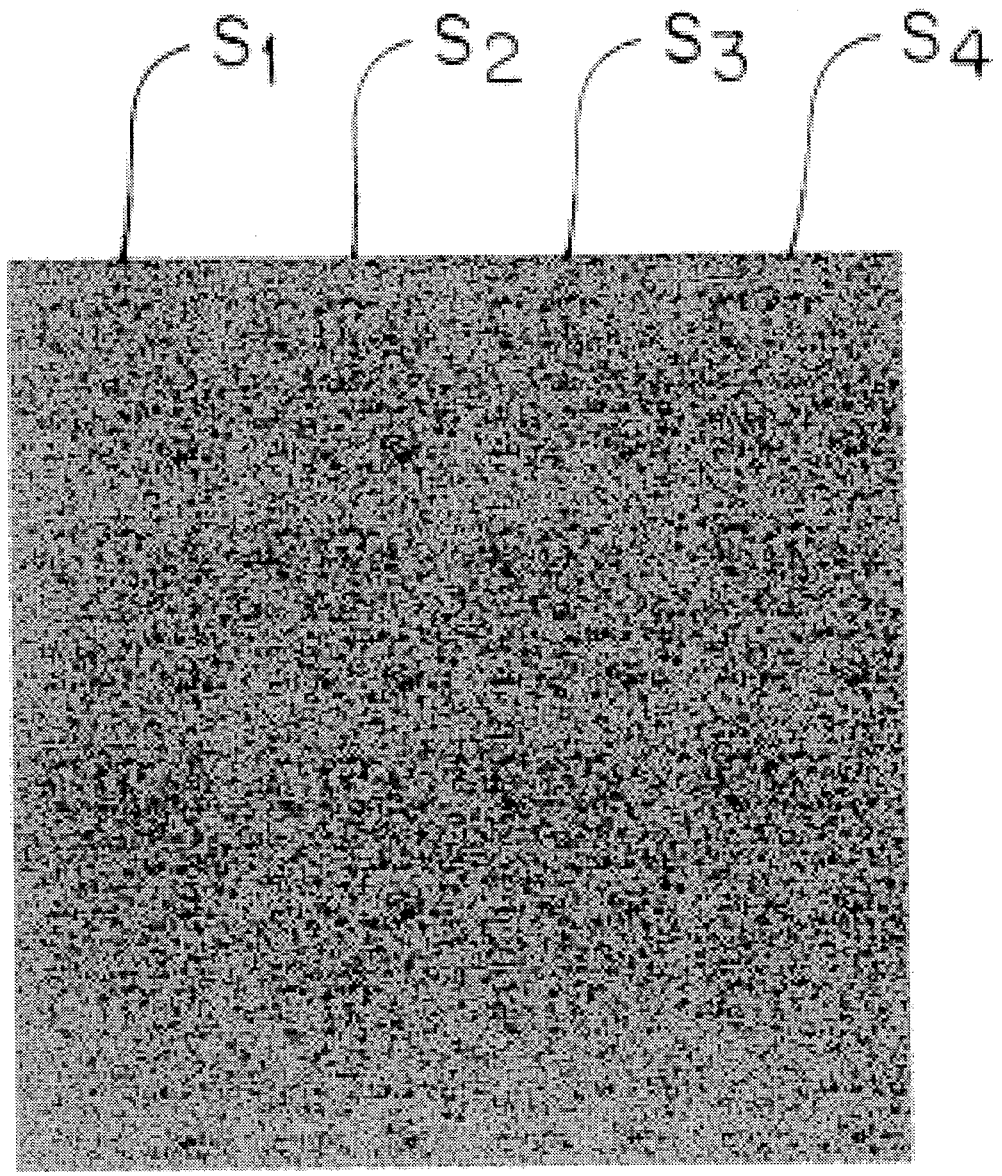
FIGS. 1A–B show a prior art halftone image pattern.
Figure 1B:
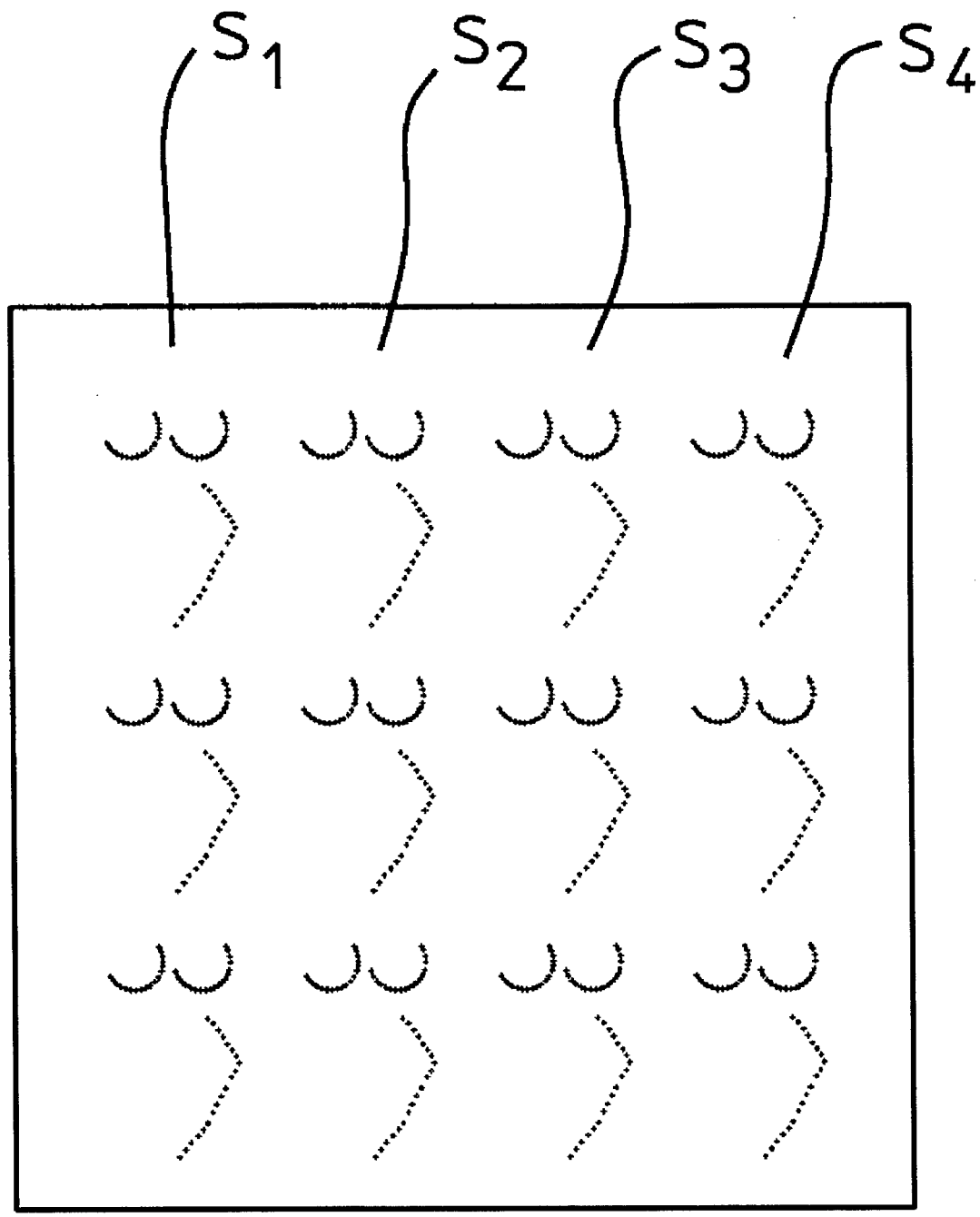
Figure 8:
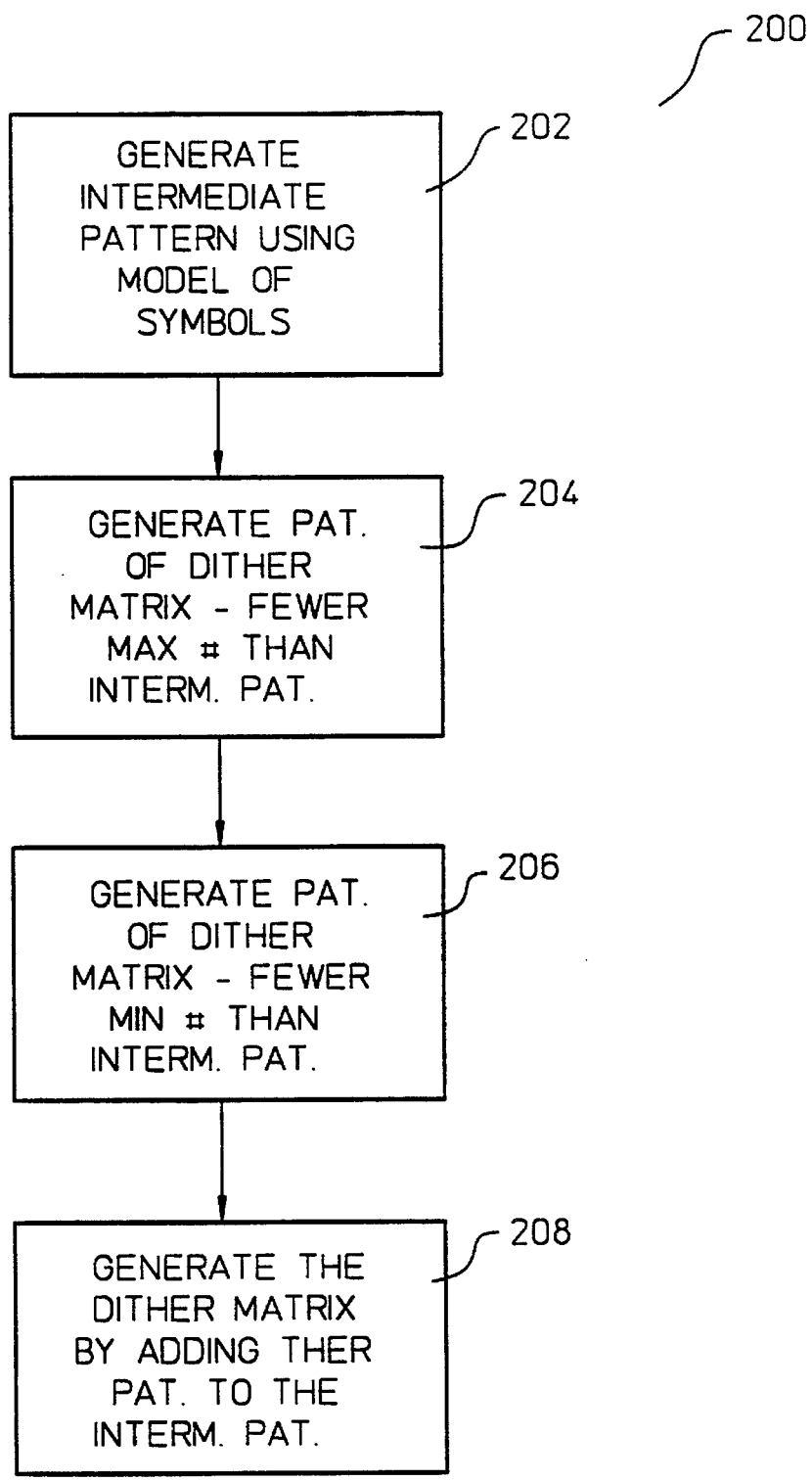
FIG. 8 shows the preferred steps to generate the dither matrix of the present invention.
Figure 9:
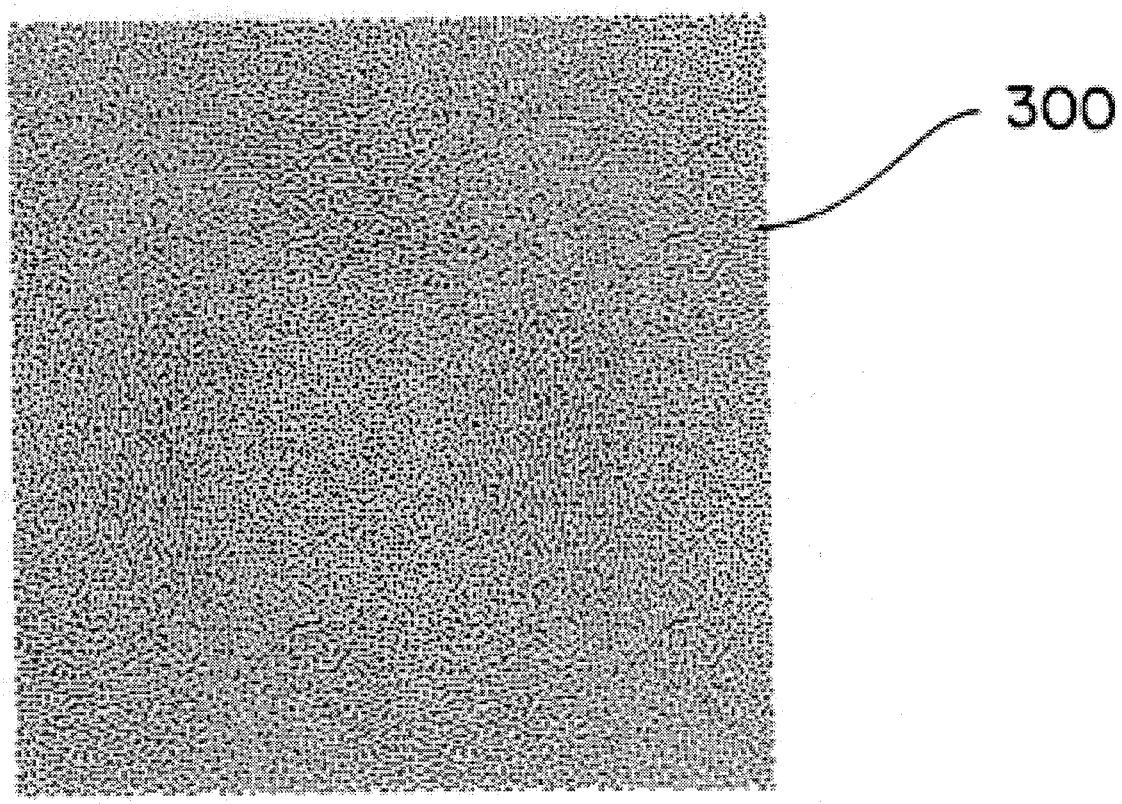
FIG. 9 shows an example of an intermediate pattern of the present invention.

FIG. 8 shows the steps 200 to generate the dither matrix 110. The first step, 202, is to generate an intermediate pattern with elements having values of either one or zero. The elements with ones are substantially uniformly distributed within the pattern. The values of the elements are dependent on the model of the symbols. FIG. 9 shows an example of an intermediate pattern 300, with 128 rows by 128 columns of elements. The pattern shown in Figure is enhanced as in FIG. 1A. A symbol printed implies that the element at that position has a value of one, and a void implies that the element at that position has a value of zero.

In the second step, 204, patterns of the dither matrix 110 with fewer elements having ones than the intermediate pattern 300 are generated. This is done through modifying the values of the elements by the model of the symbols and through replacing a plurality of ones with zeros from the intermediate pattern 300. The ones to be replaced are in regions with elements having ones clustered together as identified by a filter. The difference in the number of elements having ones from one pattern to its next pattern is dependent on a quantization number.

In the third step, 206, patterns of the dither matrix 110 with fewer zeros than the intermediate pattern 300 are generated. This is done through modifying the values of the elements by the model of the symbols and through replacing a plurality of zeros with ones from the intermediate pattern 300. The zeros to be replaced are in regions with elements having zeros clustered together as identified by the filter. The difference in the number of elements having zeros from one pattern to its next pattern is dependent on the quantization number.

Finally, in step four, 208, the dither matrix, 110, is formed by adding all the patterns to the intermediate pattern.

Steps two to four are not restricted to that sequence. Step three, 206, can be done before step two 204. Step four, 208, the summing step, can be performed as the patterns are generated. For example, after the formation of the intermediate pattern, the pattern is copied to the dither matrix. Then, as each additional pattern is generated, it is added to the dither matrix by matrix addition. So, when all the patterns are generated, the dither matrix 110 is also formed.

In the present example, the dither matrix, 110, has 128 rows by 128 columns of elements, and the grey scale image, 102, has 256 levels of lightness, including the two end levels, the level with no symbols and the level entirely covered with symbols. The levels of lightness determine the number of patterns for the dither matrix, 110. In one preferred embodiment, the total number of patterns including the intermediate pattern is 256. The difference in the number of elements having values equal to one between a pattern and its next pattern is dependent on the quantization number. In one preferred embodiment, the quantization number is the round-off of ((128, * 128)/255) or 64.

In another preferred embodiment, the quantization number depends on the change in the tone reflectance between neighboring patterns. In the present example, there are 256 patterns. To have a substantially identical change in tone reflectance between neighboring patterns, the difference in tone reflectance between them should be $1/255$. As every pattern is formed, its tone reflectance is calculated. Once its tone reflectance differs by $1/255$ from the tone reflectance of its former pattern, the next pattern is formed. One way to find the tone reflectance of a pattern is from the amount of coverage of the symbols on the pattern. This amount of coverage is preferably defined as the area occupied by the symbols on the pattern over the area occupied by the pattern. The coverage is translated by the Yule-Nielsen equation to its tone reflectance. A description of the Yule-Nielsen equation can be found in "The Penetration of Light into Paper and its Effect on Halftone Reproduction," by Yule and Nielsen, TAGA Proc., Vol 3, P. 65–76, 1951.

Figure 10:
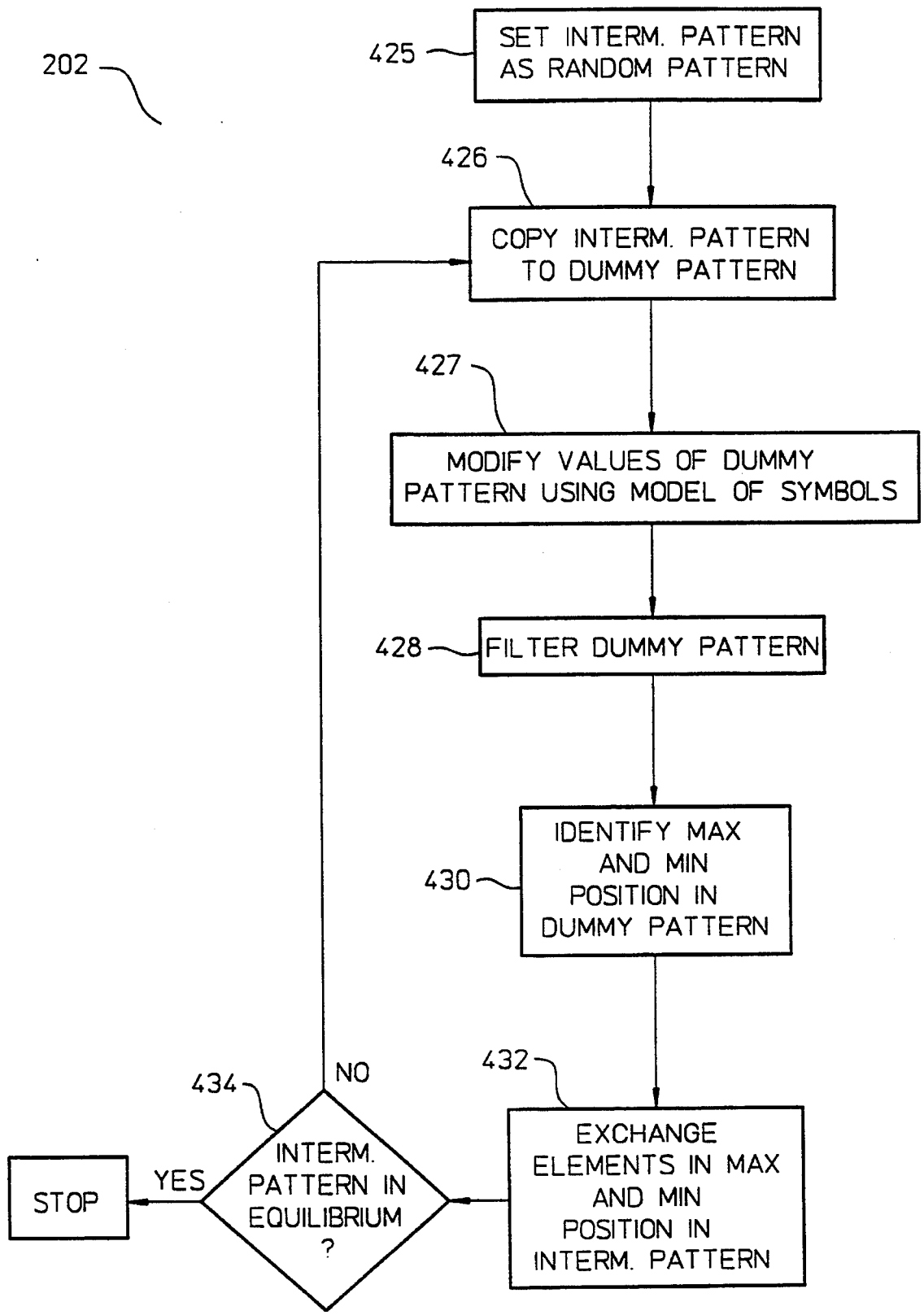
FIG. 10 describes the step of generating the intermediate pattern 300 in more detail.

FIG. 10 describes the step, 202, of generating the intermediate pattern 300, in more detail. The intermediate pattern is set, 425, to be a random pattern, with ones and zeros randomly distributed. Preferably, at least ($100/255$) percent of the elements in the random pattern have values equal to ones and at least ($100/255$) percent have values equal to zero. Then, the intermediate pattern 300 is copied to a dummy pattern, 426, and the values of the elements in the dummy pattern are modified, 427, by the model of the symbols.

Figure 11A:
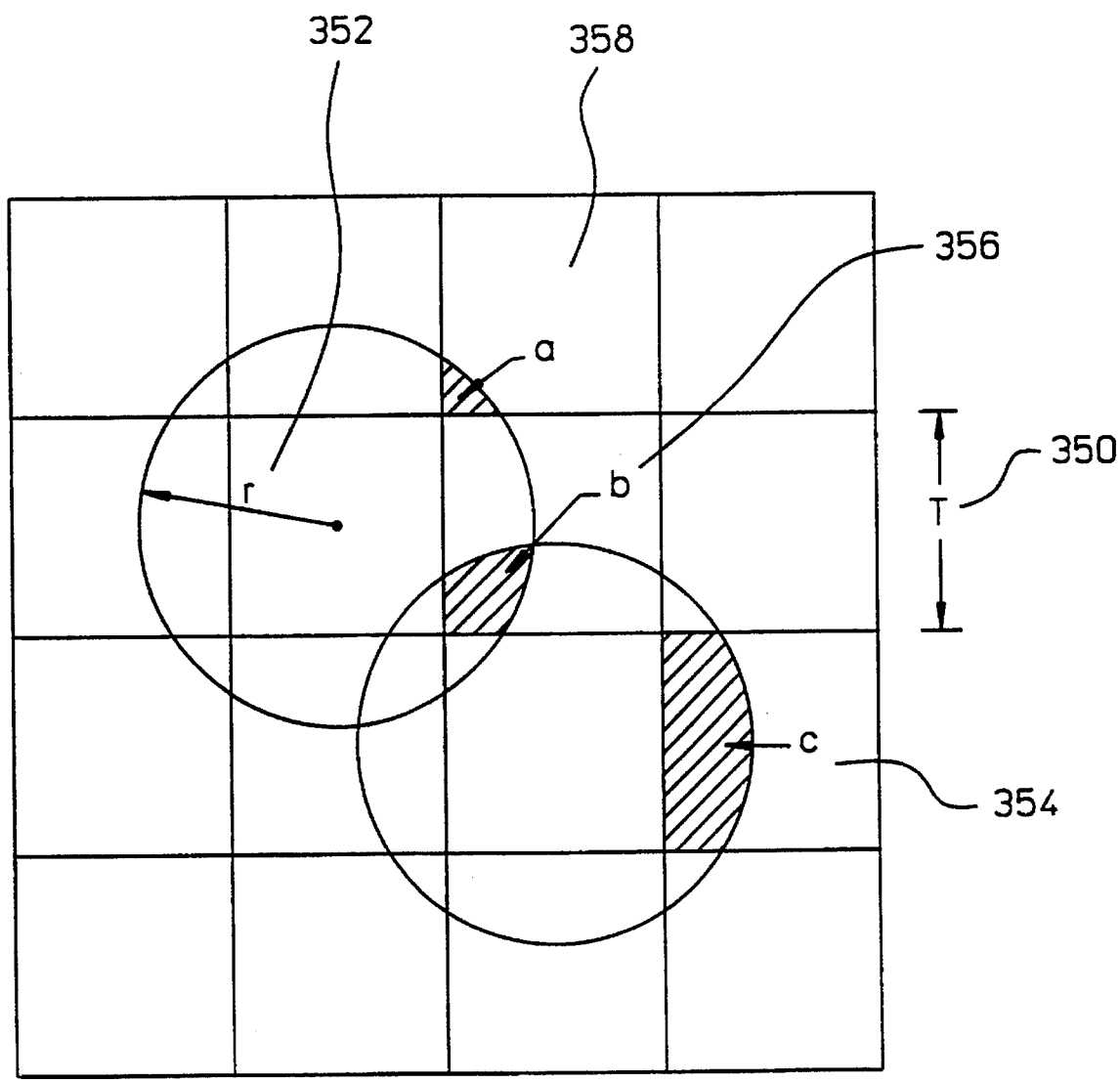
FIGS. 11A–B show a circle as a model of the symbols printed by the present invention.
Figure 11B:
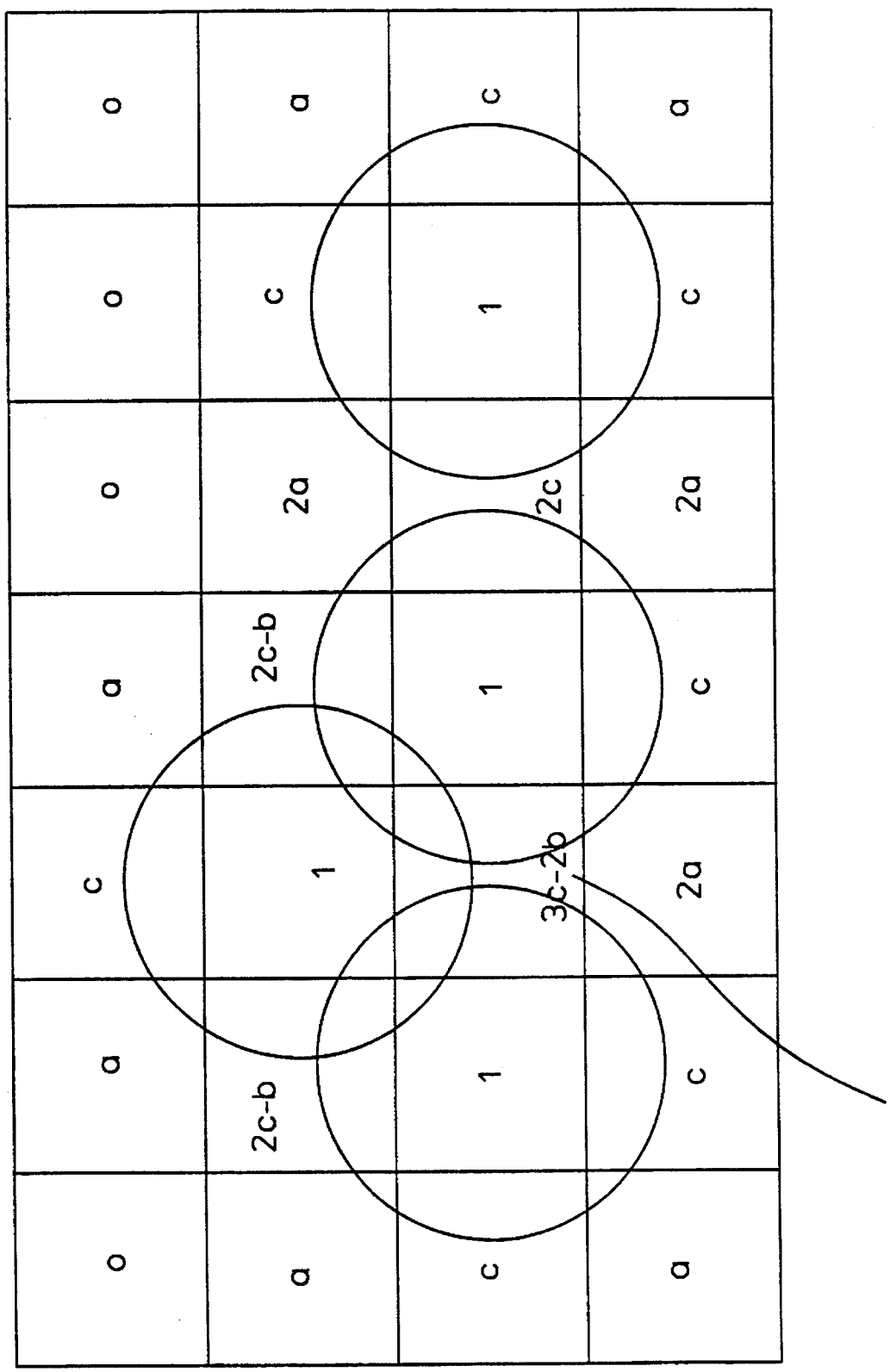

One preferred method to modify the values of the elements in the dummy pattern is to represent a symbol printed in a pixel of the halftone image 104 by a circle. FIGS. 11A–B show such a modelling. Each position of the element is represented by a square with a dimension T, and each circle has a radius r, 352. The area of overlap of a circle to its non-diagonal neighbor is c, 354. The area of overlap of a circle to its diagonal neighbor is a, 358. The area of intersection of two circles in a common non-diagonal neighbor is b, 356. With m=(r/T), the values for a, b and c are as follows:

$$a = ((\pi m^2)/4) - (m^2 \sin^{-1}(1/2m)) - ((\sqrt{4m^2 - 1})/4) + 1/4$$

$$b = (m^2 \sin^{-1}\sqrt{(2m^2 - 1)/2m^2}) - ((\sqrt{2m^2 - 1})/2) - a$$

$$c = ((\sqrt{4m^2 - 1})/4) + (m^2 \sin^{-1}(1/2m)) - 1/2$$

FIG. 11B shows the values of different elements when more of them overlap. For example, the value of the element in the position 362 is (3c−2b). All the values in the elements are modified by the above model.

Another preferred method to modify the values of the elements is to find the probability of having toner particles as a function of position. Some printers, such as laser printers, uses toner particles to generate a symbol. In one embodiment, the optical beam to generate the toner particles is guassian in shape. So one preferred probability of having toner particles follows a guassian shape.

Figure 12A:
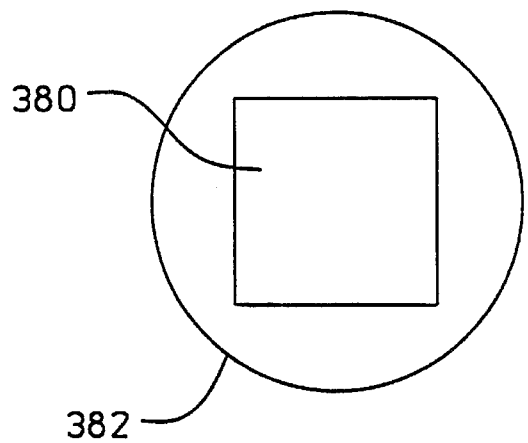
FIGS. 12A–C show a probability profile as a model of the symbols printed by the present invention.
Figure 12B:
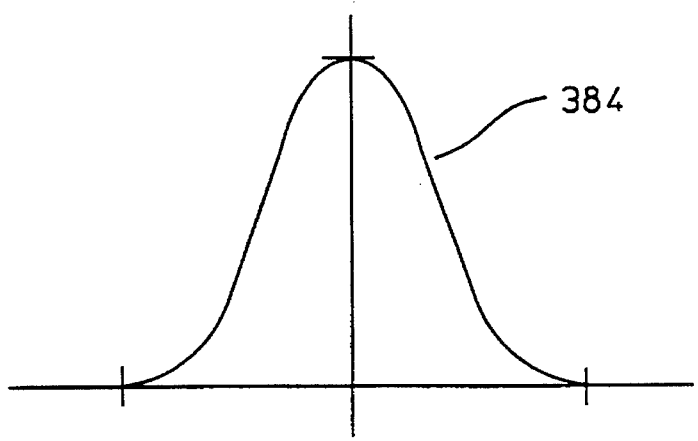
Figure 12C:
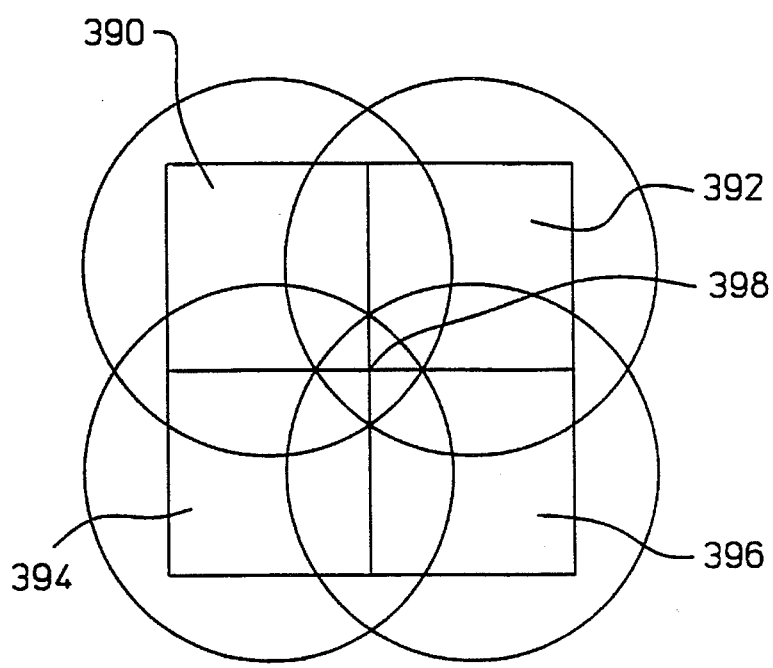

FIG. 12A shows the top view of an element 380 of the dummy pattern occupying a position and the top view of the boundary 382 of a normalized guassian function 384, as shown in FIG. 12B. FIG. 12c shows four elements A, 390, B, 392, C, 394 and D, 396 next to each other, all having the value of 1. The probability of having toner particles at their common intersection point x, 398, is calculated as follows:

$$1-((1-P_A(x))*(1-P_B(x))*(1-P_C(x))*(1-P_D(x))) \qquad (1),$$

where $P_A(x)$ is the probability of having toner particles due to the element A at position x, and similarly for $P_B(x)$, $P_C(x)$ and $P_D(x)$. If the boundary 382 of the guassian function 384 is bigger, equation one is still applicable. The only difference is that there will be more $(1-P(x))$ terms due to the influence from more elements.

In one preferred embodiment, the element 380 is subdivided into nine by nine sub-elements to more clearly represent the shape of the symbol. At the center sub-element, the probability of having toner particles is 1. The sigma of the guassian function 384 is 5.2 sub-pixels. This sigma is found experimentally using a Bayer matrix. A Bayer matrix is a disperse dot matrix as described in "An optimum method for two level rendition of continuous-tone picture," written by B. E. Bayer and published in the Proc. of IEEE Int. Conf. Communication, Conference Record, p. 26–11 to 26–15, 1973. Using the Bayer matrix, a grey ramp is printed out by the printer 105. The tone reflectance of the grey ramp is measured to generate a tone reflectance curve. The model of the symbols is then applied to the Bayer matrix and its theoretical tone reflectance curve is calculated based on the Yule-Nielsen equation. The sigma is adjusted until the calculated tone reflectance curve substantially matches the measured tone reflectance curve. Other values for the sigma of the guassian function 384 are also suitable. In this preferred embodiment, the boundary 382 of the guassian function 384 covers an area of three by three pixels.

The effects of neighboring elements are taken into account according to equation 1 to generate the probability values of all the sub-elements. After generating the probability value of every sub-element, each sub-element is assigned a value of 0 or 1 depending on its probability. One preferred way to assign a value is to use a random number generator that generates a number uniformly distributed from 0 to 1. If the probability of a sub-element is 0.6 and the output of the random number generator is 0.6 or less, then the value of the sub-element is 1, otherwise, the value is zero.

Figure 13A:
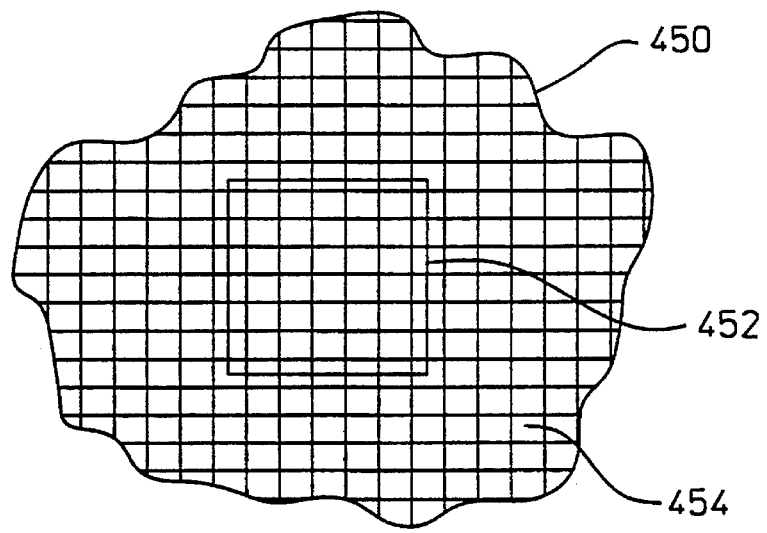
FIGS. 13A–B show bit maps as a model of the symbols printed by the present invention.
Figure 13B:
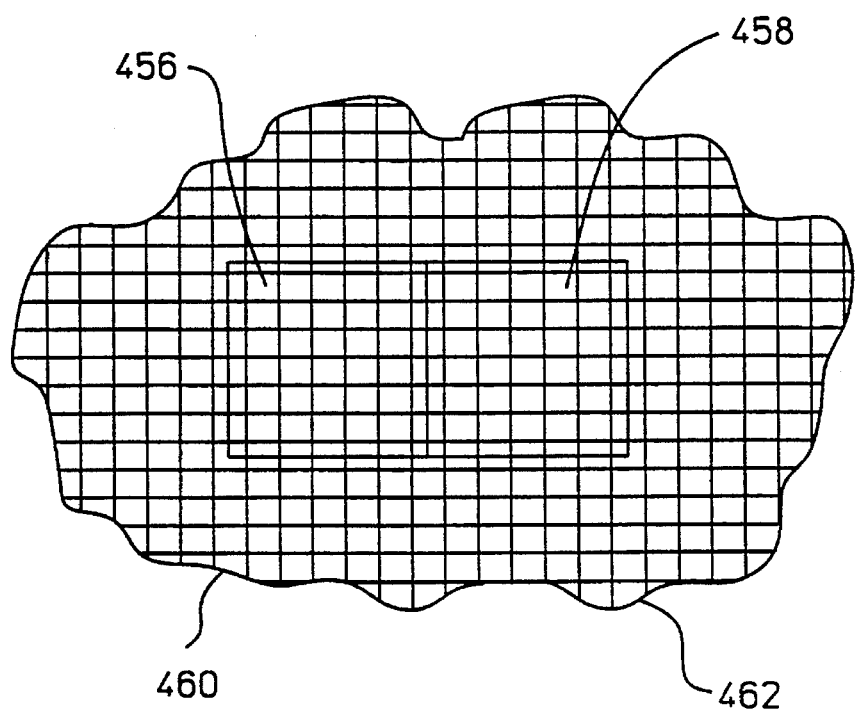

Another preferred method to represent the symbol is to digitize an actual symbol and to store the digitized values as a bit map in the computer system 100. FIG. 13A shows the bit map within a printed symbol 450 for a pixel 452 of the halftone image. Every bit, such as 454, inside the boundary of the printed symbol has a value of 1. Those bits outside have a value of zero. Every element in the dummy pattern with the value of one is replaced by the bit map. For elements next to each other, their bit maps overlap. In one preferred embodiment, for two elements next to each other, the value of every intersecting bit is the logical "OR" of the values of the bits of the two symbols. FIG. 13B shows parts of bit maps within symbols, 460, 462 for elements 456 and 458. In another embodiment, the value of every intersection bit is the sum of the values of the bits intersecting. Those intersecting bits will have a higher value. Whether one should use the logical "OR" operation or the sum operation depends on the printer and the type of printing medium, such as paper, to be used.

Referring back to FIG. 10, after the values of the elements in the dummy pattern have been modified 427, the next step is to pass the dummy pattern through the filter. One preferred filter is a normalized guassian filter with a sigma of 1.5. The dummy pattern is duplicated two dimensionally before it is filtered. This is known as circular convolution. For the modified dummy pattern, with sub-elements and bit maps, the filter has to sample more frequently, such as at every sub-element or at every bit. The filtering process will not be described in this application. A general discussion on this type of spatial filtering can be found in "Discrete Time Signal Processing," written by A. V. Opponheim and R. W. Schafer, Prentice Hall, 1989.

The filtered output would have the largest value at the location where the ones are most clustered together, and the smallest value at the location where there is the largest void. The position with the largest value is identified, 430, as the maximum position, and the position with the smallest value is identified as the minimum position, 356. If there are locations that are equally clustered or voided, then there will be more than one maximum or minimum position. In one preferred embodiment, the first position found to be the maximum and having a value of one in its corresponding position in the intermediate pattern is selected to be the maximum position. Similarly, the first position found to be the minimum and having the value of zero in its corresponding position in the intermediate pattern is selected to be the minimum position.

After the maximum and the minimum position are identified, 430, their elements in the intermediate pattern, 300, are exchanged, 432.

The intermediate pattern, 300, is then again copied to the dummy pattern to be modified by the model of the symbols and filtered. These steps are repeated numerous times, 434, until the intermediate pattern reaches an equilibrium state, such as the example shown in FIG. 9. At that point, the ones and the zeros are substantially uniformly distributed within the pattern.

Figure 14:
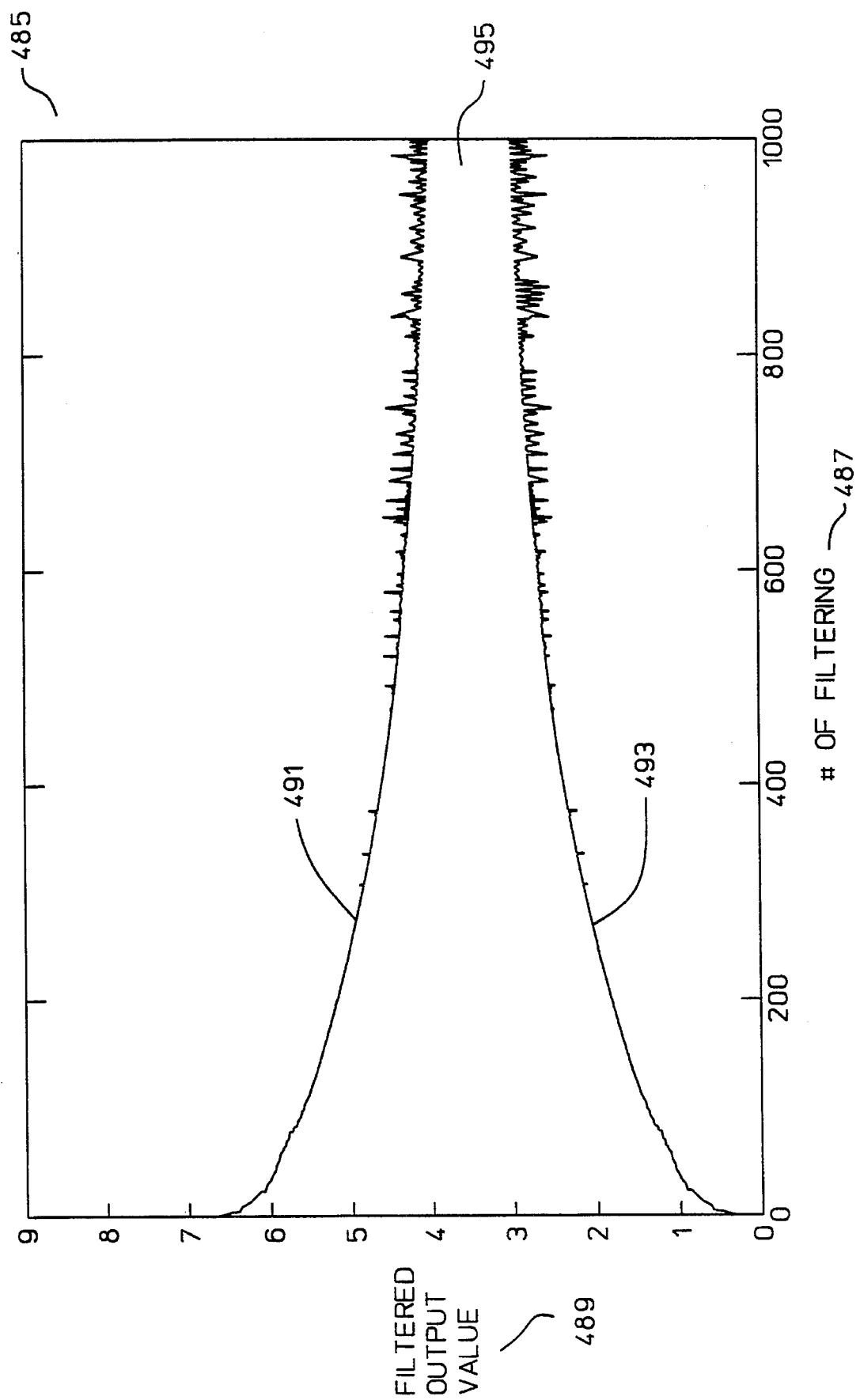
FIG. 14 shows curves of the filtered outputs as a function of the numbers of times of filtering.

A quantitative way to describe the equilibrium state is to compare the largest and the smallest value of the filtered output. FIG. 14 shows a plot, 485, of the filtered outputs, 489, as a function of the number of times of filtering, 487. The curve 491 represents the largest filtered output value as a function of the numbers of times of filtering, 487. The curve 493 represents the smallest filtered output value as a function of the numbers of times of filtering, 487. The difference between the largest and the smallest value in the filtered output decreases with more filtering until the intermediate pattern reaches its equilibrium state, 495. At the equilibrium state, 495, the difference in the largest and the smallest filtered output remains substantially constant with additional filtering. In one example, before filtering, the difference is about 7.7. At the equilibrium state, the difference is about 1.5.

Figure 15:
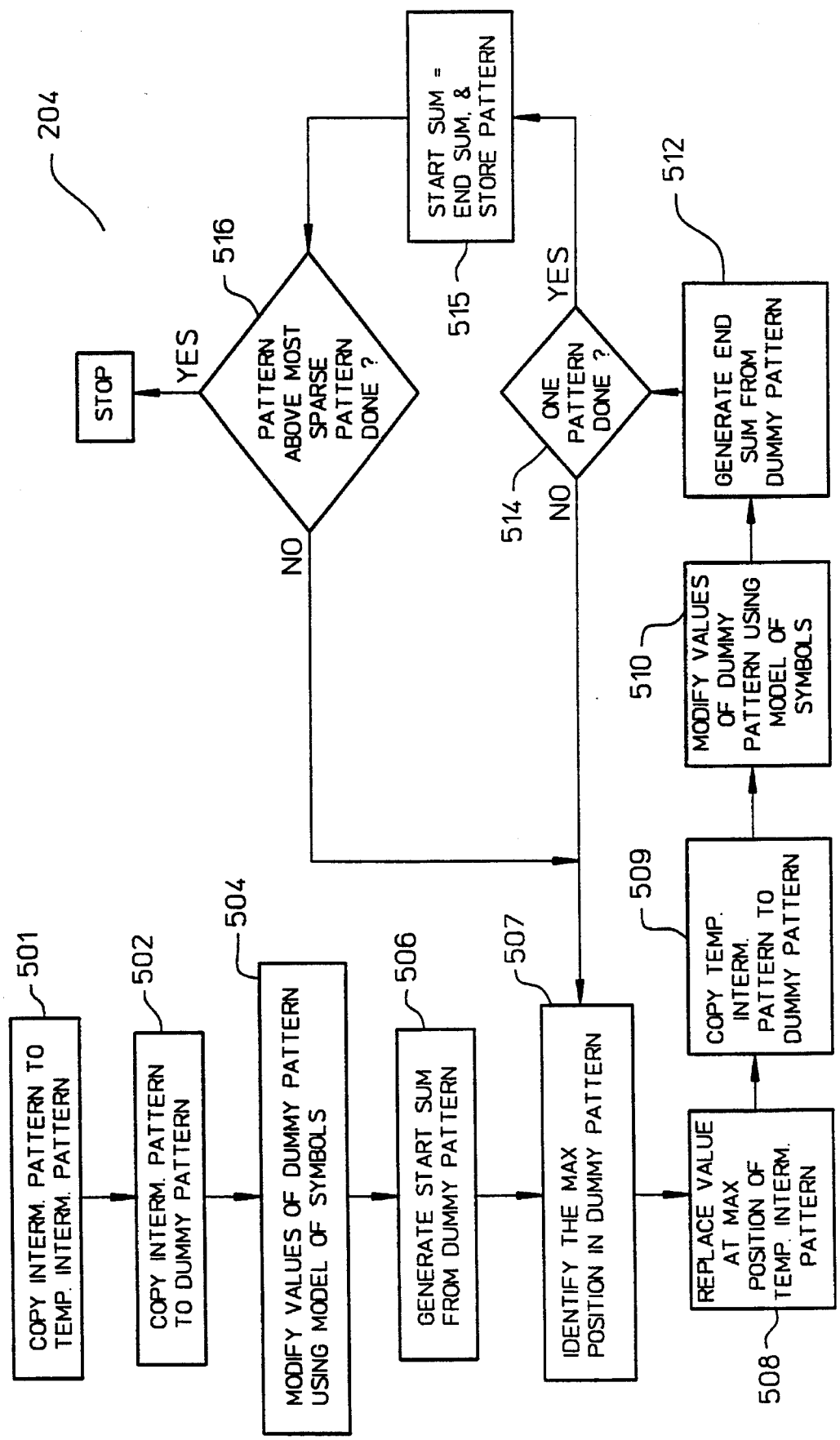
FIG. 15 describes the steps of generating patterns of the dither matrix of the present invention with fewer ones than the intermediate pattern.

The Dither matrix requires one or more patterns with elements having fewer ones. FIG. 15 describes the step, 204, of generating patterns of the dither matrix 110 with fewer ones than the intermediate pattern in more detail.

In generating the many patterns with fewer ones, first, the intermediate pattern, 300, is copied, 501, to a temporary-intermediate pattern, and is also copied, 502, into a dummy pattern. Then, the values of the elements in the dummy pattern are modified, 504, by the model of the symbols as described above, and a start sum is generated, 506.

In one embodiment, the start sum is equal to the sum of the values of the modified pattern. In a different embodiment, the start sum is the calculated tone reflectance of the modified pattern. The way to calculate the tone reflectance from the coverage of the symbols on the pattern by the Yule-Nielsen equation is as described above. The dummy pattern is then filtered to identify, 507, the position of the dummy pattern where ones are substantially most clustered as the maximum position. The identification step is similar to the methods described above by the normalized guassian filter with a sigma of 1.5 and will not be further described here. The value of the element in the maximum position of the temporary-intermediate pattern is replaced, 508, with a zero.

Then, the values of the temporary-intermediate pattern are copied, 509, to the dummy pattern. The dummy pattern is again modified by the model of the symbol, 510, and an end sum is generated, 512. The end sum is generated the same way as the start sum.

The invented method then goes back, 514, to the "identify" step 507 until the difference between the start sum and end sum is less than or equal to the quantization number to generate one pattern of the dither matrix. The start sum then is set, 515, to be the end sum, and the generated pattern is stored in the computer 100. I f the method uses the summation of the values to generate the sums, the quantization number in the present example is 64. If the method uses the tone reflectance to generate the sums, the quantization number is $1/255$.

The method then again goes back, 516, to the "identify" step 507, until the end sum is less than or equal to the quantization number to generate numerous patterns of the dither matrix 110 with fewer ones. The method will stop when the pattern above the most sparse pattern is generated because the most sparse pattern is the pattern with no symbols.

Figure 16:
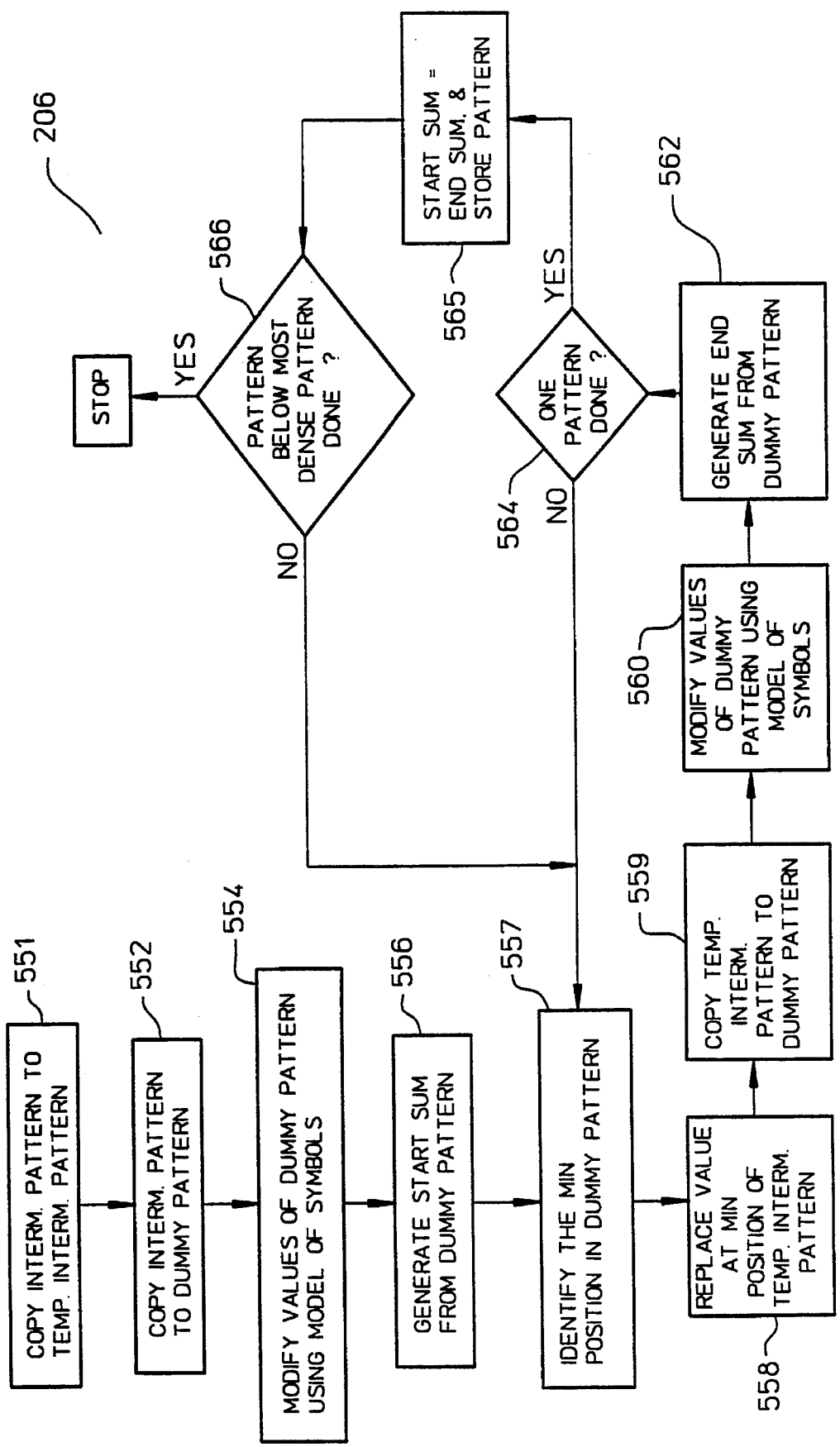
FIG. 16 describes the step of generating patterns of the dither matrix of the present invention with fewer zeros than the intermediate pattern.

The dither matrix 110 also requires one or more patterns with fewer zeros. FIG. 16 describes the step, 206, of generating patterns of the dither matrix 110 with fewer zeros than the intermediate pattern in more detail. The steps shown in FIG. 16 are similar to the steps shown in FIG. 15. First, the intermediate pattern is copied, 551, into a temporary-intermediate pattern, and is also copied, 552, into a dummy pattern. Then, the values of the elements in the dummy pattern are modified, 554, by the model of the symbols. After the modification, a start sum is generated, 556. The element in the position of the dummy pattern where elements with zeros are substantially most clustered together is identified, 557, to be the minimum position. The element in the minimum position of the temporary-intermediate pattern is replaced, 558, with a one. After that, the temporary-intermediate pattern is copied, 559, to the dummy pattern, and the values of the elements in the dummy pattern are modified, 560, by the model of the symbol and an end sum is generated, 562. The above steps are repeated, 564, from the "identify" step, 557, until the difference between the start sum and end sum is less than or equal to the quantization number to generate one pattern of the dither matrix. At that point, the start sum is set, 565, to be the end sum, and the generated pattern is stored in the computer 100. Finally, the above steps are repeated from the "identify" step, 557, until the end sum is more than or equal to ((the total number of patterns of the dither matrix−1)*the quantization number) to generate numerous patterns for the dither matrix. Note that the total number of patterns is 256 in the present example. The method will stop when the pattern below the most dense pattern is generated because the most dense pattern is the pattern totally filled with symbols.

Figure 1C:
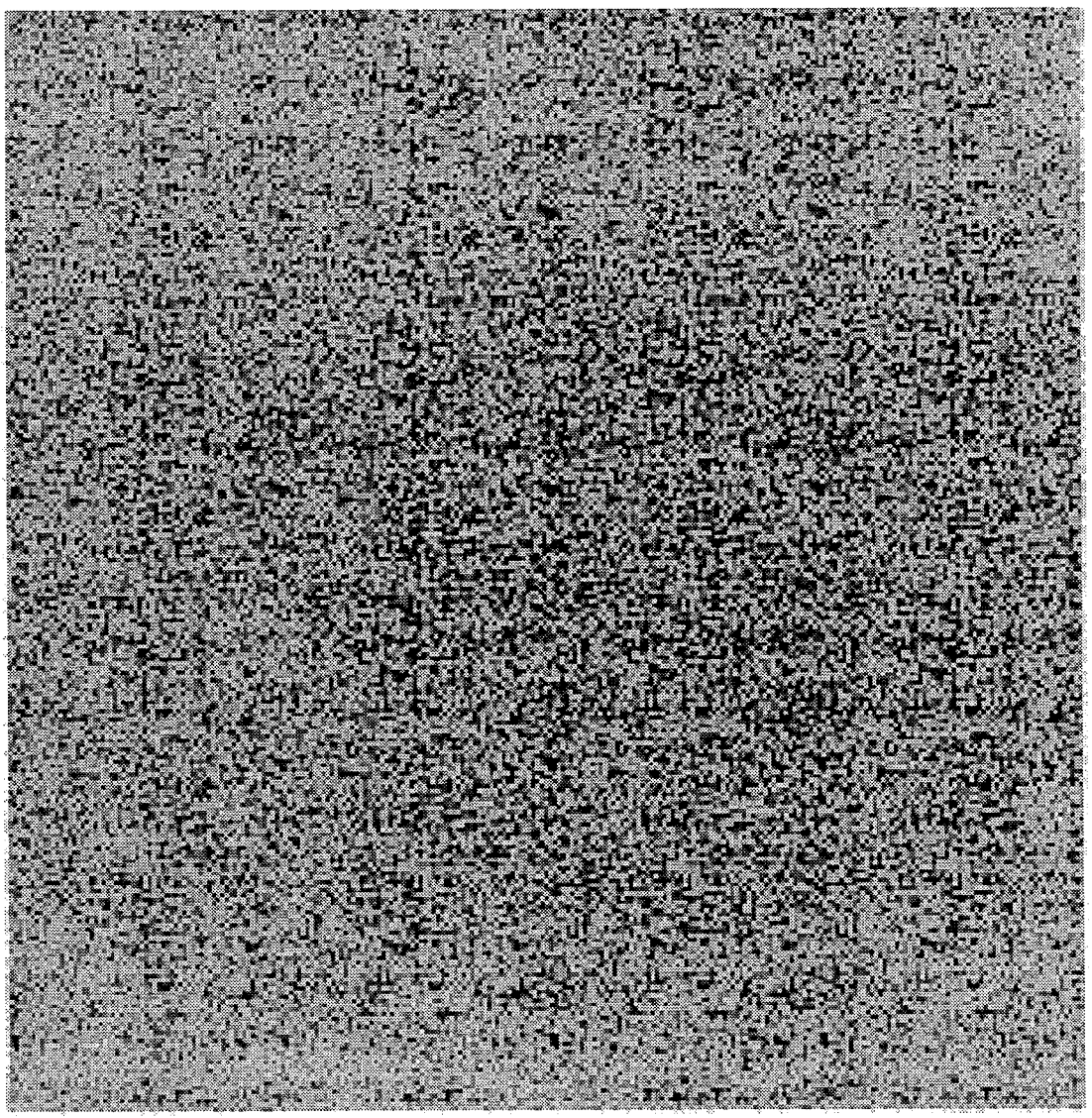
FIG. 1C shows a halftone image pattern generated by the present invention.
Figure 2:
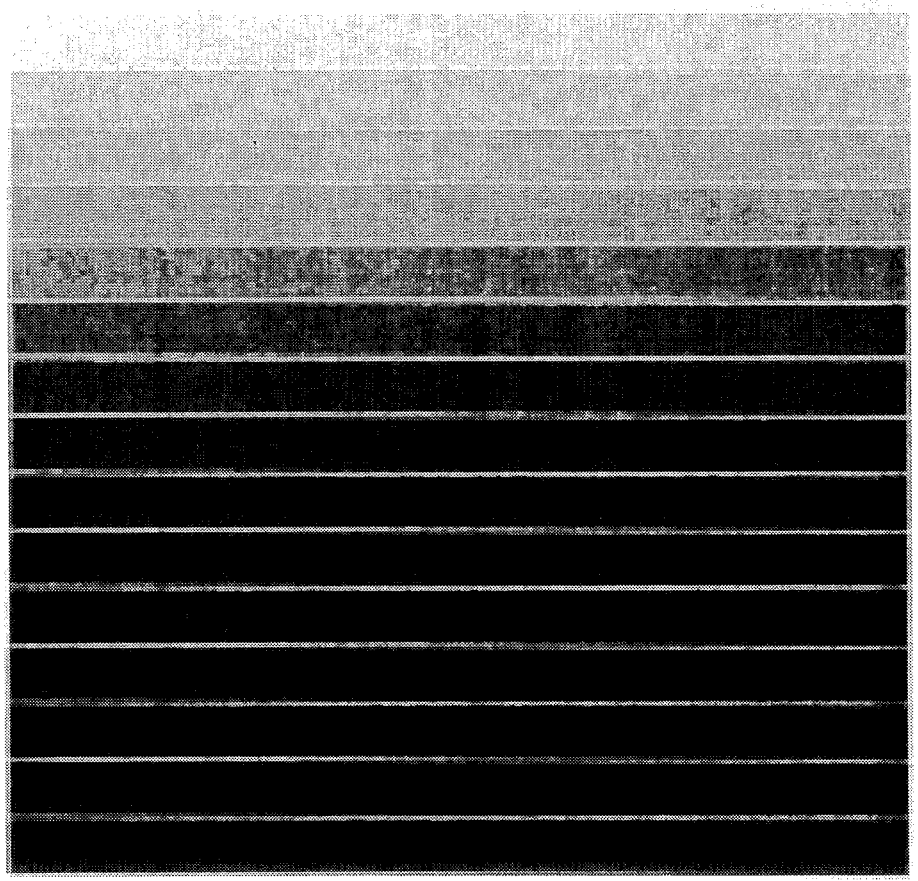
FIG. 2 shows a grey ramp of a prior art halftone image.
Figure 3:
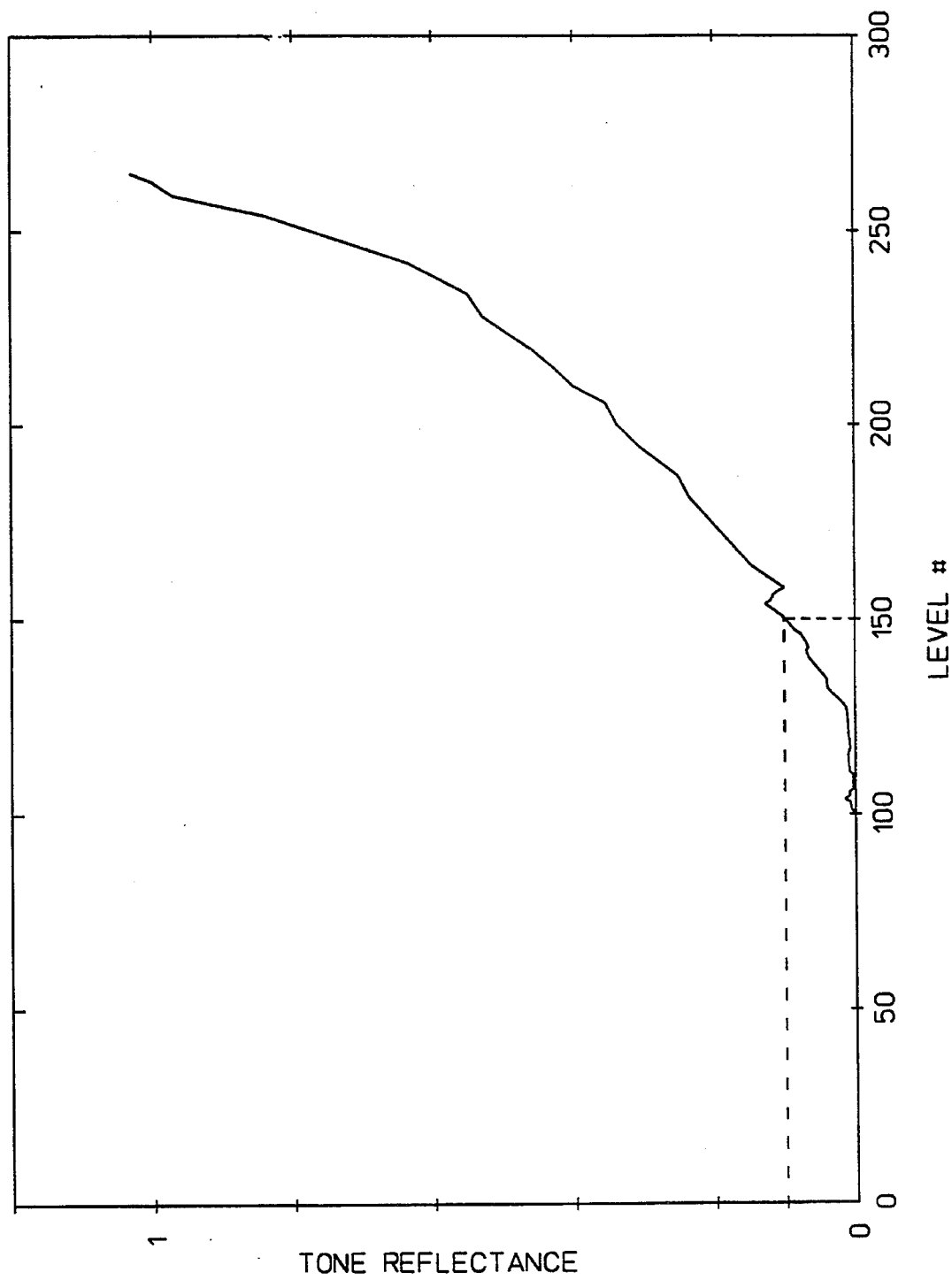
FIG. 3 shows the tone reflectance curve of a prior art grey ramp.
Figure 17:
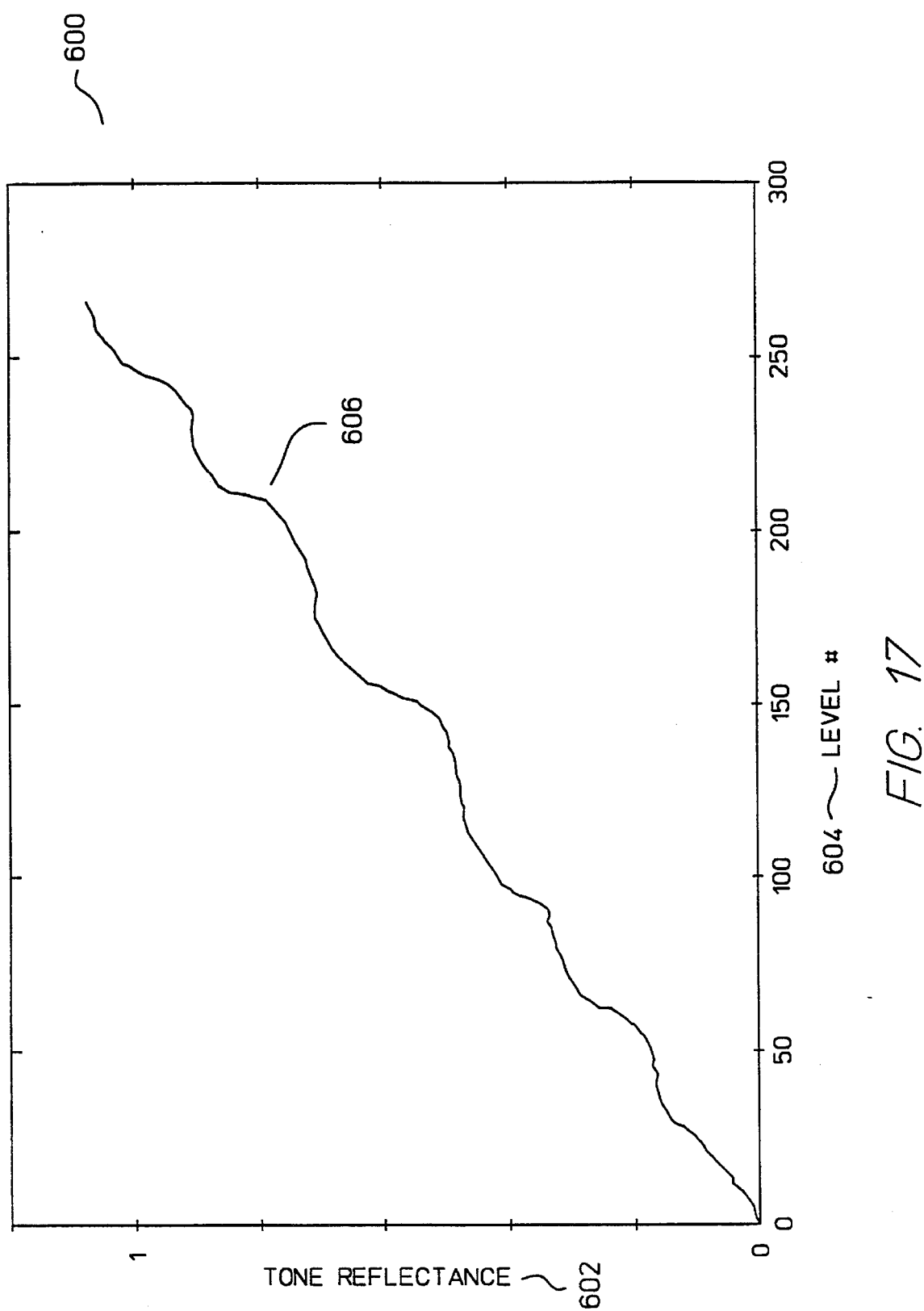
FIG. 17 shows the tone reflectance graph of the halftone image generated by the present invention.

Using the model of the symbols for the matrix, the halftone image generated by the printer 105 has negligible repetitions of perceptible shapes. This is shown in FIG. 1C by a halftone image pattern generated by the invention. The pattern is of the same level and has the same enhancement as FIG. 1A. The present invention significantly improves the quality of the halftone image when the printed symbols begin to overlap. FIG. 17 shows a plot, 600, of the tone reflectance, 602, of different levels of the grey ramp of the halftone image generated by the invention against the level number, 604, of the grey ramp. Note that the significant improvements in the linearity of the tone reflectance curve, 606 compared to the one shown in FIG. 3. Moreover, the gaps between levels of the grey ramp are substantially equal.

Other embodiments of the invention will be apparent to the skilled in the art from a consideration of this specification or practice of the invention disclosed herein. All publications cited in this specification are incorporated by reference. It is intended that the specification and examples be considered as exemplary only, with the true scope and spirit of the invention being indicated by the following claims.

I claim:

1. A method of generating a halftone image from a grey scale image by means of a dither matrix, the halftone image being represented by symbols printed by a printer, the halftone image, the grey scale image and the dither matrix each occupying an area, the three areas being substantially equal to each other, the halftone image and the grey scale image each having a plurality of pixels, each pixel having a value, and the dither matrix having a plurality of elements that are generated by a plurality of patterns, each pattern also having a plurality of elements, each element in each pattern occupying a position in the dither matrix area, each element having a value, the method comprising the steps of:

comparing the value of each pixel of the grey scale image with the value of an element in the dither matrix;

determining, based on the result of the comparison, the value of a corresponding pixel of the halftone image; and forming said half tone image with said printer by printing said symbols in accordance with the determined pixel values;

wherein the dither matrix is generated by:

selecting a model indicative of the symbols printed by the printer;

generating an intermediate pattern having a plurality of elements, each element having either a maximum or a minimum value, the values of the elements being dependent on the model of the symbols, those elements having the maximum value being distributed substantially uniformly within the pattern;

generating a plurality of other patterns, each pattern having a different number of elements of the maximum value than the intermediate pattern; and summing the intermediate pattern and the plurality of other patterns to get the dither matrix.

2. A method of generating a halftone image as recited in claim 1, wherein the image is in black-and-white.

3. A method of generating a halftone image as recited in claim 1, wherein the image is in color.

4. A method of generating a halftone image as recited in claim 1, wherein the model of the symbols printed by the printer is a circle.

5. A method of generating a halftone image as recited in claim 1, wherein the model of the symbols printed by the printer is a probability function.

6. A method of generating a halftone image as recited in claim 1, wherein the model of the symbols printed by the printer is a digitized representation of the printed symbol.

7. A method of generating a halftone image as recited in claim 1, wherein the step of "generating a plurality of other patterns" further comprises the steps of:

generating a pattern of the dither matrix with fewer elements having the maximum value than the intermediate matrix; and generating a pattern of the dither matrix with fewer elements having the minimum value than the intermediate matrix.

8. A method of generating a halftone image as recited in claim 1, wherein the step of "generating an intermediate pattern" further comprises:

using a random pattern as the starting values for the intermediate pattern, the random pattern having elements of randomly distributed maximum and minimum values;

copying the intermediate pattern into a dummy pattern;

modifying the values of the elements in the dummy pattern by the model of the symbols;

filtering the dummy pattern by the filter;

identifying from the filtered output the position having the element with the largest value as the maximum position and identifying the position having the element with the smallest value as the minimum position;

exchanging elements in the maximum and minimum position of the intermediate pattern; and repeating from the step of "copying the intermediate pattern" until the intermediate pattern has reached an equilibrium state.

9. A method of generating a halftone image as recited in claim 8, wherein the intermediate pattern has reached the equilibrium state when the difference between the largest and the smallest value in the filtered output remains substantially constant with additional filtering.

10. A method of generating a halftone image as recited in claim 7, wherein the step of "generating a pattern of the dither matrix with fewer elements having the maximum values" further comprises:

copying the intermediate pattern into a dummy pattern;

modifying the values of the elements in the dummy pattern by the model of the symbols;

generating a start sum from the values of the elements in the dummy pattern;

filtering the dummy pattern by the filter;

identifying from the filtered output the position having the element with the largest value as the maximum position;

replacing the value of the element in the maximum position of the intermediate pattern with the minimum value;

copying the intermediate pattern into the dummy pattern; modifying the values of the elements in the dummy pattern by the model of the symbols;

generating an end sum from the values of the elements in the dummy pattern;

repeating from the "filtering" step until the difference between the start sum and end sum is less than or equal to a quantization number to generate one pattern of the dither matrix;

setting the start sum equal to the end sum; and repeating from the "filtering" step until the end sum is less than or equal to the quantization number.

11. A method of generating a halftone image as recited in claim 8, wherein the step of "generating a pattern of the dither matrix with fewer elements having the minimum values" further comprises:

copying the intermediate pattern into a dummy pattern;

modifying the values of the elements in the dummy pattern by the model of the symbols;

generating a start sum from the values of the elements in the dummy pattern;

filtering the dummy pattern by the filter;

identifying from the filtered output the position having the element with the smallest value as the minimum position;

replacing the value of the element in the minimum position of the intermediate pattern with the maximum value;

copying the intermediate pattern into the dummy pattern; modifying the values of the elements in the dummy pattern by the model of the symbols;

generating an end sum from the values of the elements in the dummy pattern;

repeating from the "filtering" step until the difference between the start sum and end sum is less than or equal to a quantization number to generate one pattern of the dither matrix;

setting the start sum as the end sum; and repeating from the "filtering" step until the end sum is more than or equal to ((the total number of patterns of the dither matrix−1)*the quantization number).

12. A method of generating a halftone image as recited in claim 1, wherein:

the dither matrix has n by m elements;

the dither matrix has p patterns;

each element has a value selected from the list of one and zero; and the difference in the number of elements having values equal to one between a pattern and its next pattern is dependent on $(m*n)/(p-1)$.

13. A method of generating a halftone image as recited in claim 1, wherein:

the dither matrix has n by m elements;

the dither matrix has p patterns;

each element has a value selected from the list of one and zero; and the difference in the number of elements having values equal to one between a pattern and its next pattern is dependent on $1/(p-1)$.

* * * * *